(12) United States Patent
Mahl

(10) Patent No.: US 9,951,868 B2
(45) Date of Patent: Apr. 24, 2018

(54) PISTON RING COMPRISING A GROOVE IN THE CIRCUMFERENTIAL DIRECTION

(71) Applicant: FEDERAL-MOGUL FRIEDBERG GMBH, Friedberg (DE)

(72) Inventor: Markus Mahl, Dasing/Taiting (DE)

(73) Assignee: Federal-Mogul Friedberg, Friedberg (DE)

( * ) Notice: Subject to any disclaimer, the term of this patent is extended or adjusted under 35 U.S.C. 154(b) by 0 days.

(21) Appl. No.: 15/312,293

(22) PCT Filed: Mar. 18, 2015

(86) PCT No.: PCT/EP2015/055621
§ 371 (c)(1),
(2) Date: Nov. 18, 2016

(87) PCT Pub. No.: WO2015/176843
PCT Pub. Date: Nov. 26, 2015

(65) Prior Publication Data
US 2017/0089461 A1    Mar. 30, 2017

(30) Foreign Application Priority Data
May 19, 2014 (DE) .......................... 10 2014 209 391

(51) Int. Cl.
*F16J 9/20* (2006.01)
(52) U.S. Cl.
CPC ........................ *F16J 9/20* (2013.01)
(58) Field of Classification Search
CPC ...... F16J 9/20; F16J 9/203; F16J 9/206; F16J 9/00

USPC ........................................................ 277/460
See application file for complete search history.

(56) References Cited

U.S. PATENT DOCUMENTS

| 1,354,287 | A | | 9/1920 | Erlichman | |
|---|---|---|---|---|---|
| 1,403,008 | A | | 1/1922 | Carrier | |
| 1,406,763 | A | * | 2/1922 | Schoen | F16J 9/20 |
| | | | | | 277/460 |
| 1,773,878 | A | * | 8/1930 | Shannon | F16J 9/20 |
| | | | | | 277/485 |
| 2,131,970 | A | * | 10/1938 | Ritz | F16J 9/20 |
| | | | | | 277/461 |
| 7,207,571 | B2 | * | 4/2007 | Yoshida | F16J 9/206 |
| | | | | | 277/434 |
| 2002/0017761 | A1 | * | 2/2002 | Dubose | F16J 9/063 |
| | | | | | 277/435 |
| 2011/0100318 | A1 | * | 5/2011 | Higuchi | F16J 9/20 |
| | | | | | 123/193.6 |

FOREIGN PATENT DOCUMENTS

| GB | 316 802 A | | 8/1929 | |
|---|---|---|---|---|
| GB | 316802 A | * | 8/1929 | ............... F16J 9/20 |
| WO | WO 2014/072115 A1 | | 5/2014 | |

* cited by examiner

*Primary Examiner* — Nathan Cumar
(74) *Attorney, Agent, or Firm* — Robert L. Stearns; Dickinson Wright, PLLC

(57) ABSTRACT

A piston ring for an internal combustion engine or for a compressor, in particular a piston ring includes an exterior running surface (3), two flanks (5, 6), and an interior circumferential surface (7); the running surface (3) has a profiled section with a groove (2), the groove (2) being located between an upper portion (3') of the running surface and a lower portion (3") of the running surface in relation to the cross-section of the piston ring (1).

18 Claims, 3 Drawing Sheets

000
PISTON RING COMPRISING A GROOVE IN THE CIRCUMFERENTIAL DIRECTION

BACKGROUND OF THE INVENTION

1. Technical Field

The present invention relates to a piston ring for an internal combustion engine or respectively for a compressor, in particular a piston ring with a groove arranged on the running surface.

2. Related Art

Modern, large-volume engines for ships are still two-stroke diesel engines, because this type of engine can be constructed, so that their rotation speed typically lies in a range of approximately 50 rpm to 250 rpm (typically below 100 rpm) and their output can reach up to approximately 100 MW, depending on the number of cylinders. Such large-volume, slow-running two-stroke ships' engines preferably act directly on the drive shaft (s) of the propeller(s), because owing to their rotation speed a reduction gear for rotation speed reduction can be dispensed with.

Typically, such large-volume, two-stroke engines have two separate oil circuits, one for the engine lubrication and one for the cylinder lubrication. The cylinder lubrication ensures that at a suitable moment enough lubricating oil is made available in order to guarantee a sufficient lubrication of the cylinder surfaces or respectively of the piston rings.

The cylinder lubricating oil, depending on the load of the machine, is injected through the bush into the piston chamber. The piston rings run on this lubricating film, the bearing contact surface. The concern here, inter alia, is to inject as little lubricating oil as possible, in order to save costs and to prevent an excess lubrication. The cylinder lubrication takes place for example in the upper stroke third, by lubricating oil being fed into the cylinder by a lubricating oil pump through lubricating oil inlets, which are provided for example in a plane in the cylinder wall, so that the lubrication of the piston and of the piston ring is guaranteed in as optimum a manner as possible. The feeding of oil into the cylinders usually takes place in the gas counter-pressure process.

For example, a lubricating oil injection system can be used, which doses lubricating oil precisely via nozzles into the cylinders. A computer-controlled system registers in which position a piston is situated and then feeds lubricating oil in a targeted manner. This takes place with high pressure, so that the lubricating oil is sprayed very finely, in order to obtain as uniform a wetting as possible of the cylinder bush, but in a targeted manner where the piston rings are situated and where the friction actually takes place.

When one takes into account that modern, large-volume two-stroke ships' engines are operated with a rotation speed of approximately 50 rpm up to 150 rpm with a stroke of up to 2500 mm, the time span which is available for the feeding of the lubricating oil and the distribution of the fed lubricating oil is small and poses great challenges for ensuring the quality of the lubrication. If one assumes, for example, that a cylinder has an (inner) diameter of 900 mm and 3 inlets, distributed uniformly over the circumference for feeding oil are provided in the cylinder wall, the fed lubricating oil must be distributed, starting from the respective inlets, in the provided time span over a length of approximately 350 mm in circumferential direction.

It is found that in conventional configuration of the one or more piston rings, owing to a lack of pressure gradients in circumferential direction, no or only a very small distribution of the lubricating oil is obtained in circumferential direction (a maximum of approximately 3%).

SUMMARY OF THE INVENTION

The field of application of the present invention are internal combustion engines in general, also outside usage in ships.

It is an object of the present invention to provide a piston ring which, with sufficient lubrication conditions, guarantees a low oil consumption and a low passage of leakage gas (blow-by) and also is able to be produced in a favourable manner.

According to the present invention, a piston ring with an external running surface, two (piston ring) flanks and an internal circumferential surface is provided, wherein the running surface has a profiling in the form of a groove. The groove is arranged here, with respect to the cross-section of the piston ring, between an upper running surface portion and a lower running surface portion.

The running surface of the piston ring which is constructed in such a manner can receive lubricating oil in a cavity which is formed by the groove and a counter running surface. Hydrodynamic pressures can build up in the circumferential direction in the groove in the continuous operation. These hydrodynamic pressures result in pressure gradients which cause lubricating oil flows and a redistribution of the lubricating oil. The redistribution of the lubricating oil, brought about hydrodynamically, leads to a reduction of the required amount and to a more uniform distribution, with respect to the circumferential direction, of the lubricating oil which is fed or injected into the groove.

Therefore, as desired, a uniform bearing contact surface of lubricating oil is obtained with respect to the circumference, in order to guarantee sufficient lubrication conditions, to seal as uniformly as possible against the passage of leakage gas (blow-by) (or respectively to obtain as small a passage of leakage gas (blow-by) as possible), to be able to scrape off the lubricating oil effectively in the working direction of the piston and to enable an overrunning.

In an embodiment of the piston ring, the groove runs at a constant distance to the flanks. In an embodiment of the piston ring, the groove runs in the centre between the flanks or respectively the upper flank and the lower flank. This embodiment enables a particularly simple production, because the piston ring does not have to be aligned before the introduction of the groove, and it is sufficient to introduce the groove in the centre of the outer surface.

In a further embodiment of the present invention, the groove runs in an undulating manner between the upper flank and the lower flank of the piston ring. In this embodiment, on each upward and downward movement the oil is urged in the direction of the concave portion of the groove lying further behind in the running direction. Together with an opposite movement with a corresponding reversed movement, the ring with an undulating groove can distribute the oil better than a ring with a flat, straight-running groove.

In a further example embodiment, an undulating form of the undulating groove forms a sine wave or a cosine wave, which runs around the piston ring. This embodiment is aimed, on the one hand, at describing the course of the groove at the thrust ends close to a flank, which corresponds to a sine wave. On the other hand, this embodiment is also aimed at describing the start of the coarse of the groove at the thrust ends close to the centre between the flanks, which corresponds to a cosine wave.

In an additional example embodiment, an undulating form of the undulating groove forms an asymmetrical or respectively sawtooth-like wave between the flanks. This embodiment can be used to give the piston ring itself a preferred direction for a rotary movement in the piston ring groove of the piston. This effect can be intensified if the groove itself is embodied asymmetrically, so that the ring can float more easily in one direction on an oil film. Here, the more intensively acting parts of the asymmetry can achieve an effective rotary movement of the piston ring for all strokes.

The periodically varying groove brings it about that in continuous operation hydrodynamic pressures build up or respectively occur in the circumferential direction. These hydrodynamic pressures result in pressure gradients which cause lubricating oil flows and produce a redistribution of the lubricating oil. The hydrodynamically caused redistribution of the lubricating oil leads to a reduction of the required amount and a more uniform distribution, with respect to circumferential direction, of the lubricating oil which is fed or injected into the groove.

A groove in the running surface of a piston ring can be arranged between two running surface sections which are configured substantially so as to be crowned in a convex manner. The groove has a periodically varying course in circumferential direction.

In an additional example embodiment of the piston ring, the amplitude of the wave in the undulating groove changes in its course in circumferential direction. Thereby, any difference occurring in the oil film can be compensated, which is caused by an irregular contact pressure of the piston ring.

In another example embodiment of the piston ring, the wave length of the wave alters, in which the undulating groove runs in circumferential direction. In this embodiment, the groove can be adapted, to a piston ring which shows a varying twisting or respectively turning over its circumference.

In another example embodiment of the piston ring, the amplitude of the wave increases in the direction of the thrust ends. In a further example embodiment of the piston ring, the amplitude of the wave decreases in the direction of the thrust ends. These embodiments are aimed at piston rings which show a greater or lesser twisting at the thrust ends than in the region which lies opposite the thrust ends.

In a further example embodiment of the piston ring, the amplitude of the shaft decreases in the direction of the thrust ends and/or the wave length of the wave increases in the direction of the thrust ends. These embodiments are also aimed at piston rings which show a greater or lesser twisting at the thrust ends than in the region which lies opposite the thrust ends.

In a further example embodiment of the piston ring, the groove ends before a thrust region of the piston ring. In this embodiment, it can be prevented that the oil which is situated in the groove is transported to the piston ring gap and at this site leaves behind an excess of oil on a cylinder inner wall.

In an additional embodiment of the piston ring, the groove has a constant cross-section over its length and preferably has a constant cross-sectional shape, with constant depth and constant width. This restriction does not concern the end regions of the groove which can comprise a transition region with a cross-sectional change between 1 and 10 mm, and which can be caused by the production of the groove.

In a further embodiment of the piston ring, the groove has a round cross-section. In a further embodiment of the piston ring, the groove as an oval or respectively elliptical cross-section. In another embodiment of the piston ring, the groove has a rectangular cross-section. In an additional embodiment of the piston ring, the groove has a trapezoidal cross-section.

A groove which is round in cross-section has the advantage that it can be machined relatively easily or produced, in a non-machining manner. A groove which is round in cross-section has the additional advantage that relatively great manufacturing tolerances are produced, because an angle between the running surface and the edge of the groove only alters slightly when the alignment of the tool deviates. A shape which is round or elliptical in cross-section can only poorly achieve an angle difference between an upper or respectively lower running surface and a tangent at the groove. A rectangular and trapezoidal groove has the advantage that deviations in the processing depth have no effect at all on an angle between a flank of the groove and the running surface.

In a further embodiment of the piston ring, the groove which is round in cross-section has a radius of 0.2 to 2 mm. In a further embodiment of the piston ring, the groove which is round in cross-section has a radius of 0.4 to 1.6 mm. In a further embodiment of the piston ring, the groove which is round in cross-section has a radius of 0.6 to 1.2 mm. In a further embodiment of the piston ring, the groove which is round in cross-section, has a radius of 0.2 to 0.4 mm. In a further embodiment of the piston ring, the groove which is round in cross-section has a radius of 0.4 to 0.6 mm. In a further embodiment of the piston ring, the groove which is round in cross-section, has a radius of 1.2 to 1.6 mm. In a further embodiment of the piston ring, the groove which is round in cross-section, has a radius of 1.6 to 2 mm. These values cover the range of automotive applications up to large-size engines. The actual size of the groove will also partly depend on the engine which is used and the planned lubricant and the average piston speed of the engine.

In an additional embodiment, the groove in the piston ring comprises an upper groove flank and a lower groove flank. The groove flank, in the case of a round groove, is regarded as the tangent of the groove at an edge or at a turning point on the transition into a rounded edge. The following angles concern here respectively the tangent to a tangent of the running surface at the edge or the turning point on the transition into the rounded edge. Therefore, the following angles are also defined for round grooves and crowned running surfaces.

In an embodiment, the upper groove flank (or respectively its tangent) forms with the upper running surface portion (or respectively its tangent) an upper angle of 45° to 135°. In another embodiment, the upper groove flank (or respectively its tangent) forms with the upper running surface portion (or respectively its tangent) an upper angle of 60° to 120°. In a further embodiment, the upper groove flank (or respectively its tangent) forms with the upper running surface portion (or respectively its tangent) an upper angle of 70° to 110°.

In an embodiment, the lower groove flank (or respectively its tangent) forms with the lower running surface portion (or respectively its tangent) a lower angle of 90° to 170°.

In another embodiment, the lower groove flank (or respectively its tangent) forms with the lower running surface portion (or respectively its tangent) a lower angle of 110° to 160°. In a further embodiment, the lower groove flank (or respectively its tangent) forms with the lower running surface portion (or respectively its tangent) a lower angle of 120° to 150°. The said angles refer to straight portions of the running surface or respectively of the groove. In the case of curved grooves or running surfaces, for determination the angles between the respective tangents of the groove or respectively of the running surface are to be used, which are present at the edge or at which the groove or respectively the running surface continues onto an edge rounding. This is able to be established particularly simply when the edge has been rounded with a defined radius.

In a further additional embodiment of the present invention, the upper angle is smaller by 2° to 30° than the lower angle. In an another further embodiment of the present invention, the upper angle is smaller by 4° to 20° than the lower angle. In another additional embodiment of the present invention, the upper angle is smaller by 6° to 10° than the lower angle. This can be achieved in the case of grooves having a circular cross-section in particular by a corresponding form of the respective running surfaces.

In a further embodiment of the piston ring, the upper angle is between 70 and 100 degrees, wherein, the lower angle has 120° to 150°, wherein preferably the upper angle is between 20 and 30° smaller than the lower angle.

In an additional embodiment, one edge of the upper angle has an upper radius of curvature of 10 to 50 μm. In another embodiment, the edge of the lower angle has a lower radius of curvature of 40 μm to 120 μm. In a further embodiment, the upper radius of curvature is smaller by 10 μm to 40 μm than the lower radius of curvature. These dimensions give reason to except an advantageous scraping effect of oil on a cylinder inner wall.

In a further embodiment of the piston ring, the external running surface has a radius of curvature between 10 and 60 mm, preferably between 20 and 40 mm, and further preferably between 25 and 30 mm.

In another embodiment of the piston ring, the number of periods of the undulating course is in whole numbers, this embodiment permits in particular piston rings with symmetrical grooves.

In another embodiment of the piston ring, the running surfaces of the piston ring are configured substantially symmetrically.

In another embodiment, the number of periods of the undulating course is between inclusively 4 and inclusively 36. In a further embodiment, the number of the periods of the undulating course is between inclusively 6 and inclusively 24. In an additional embodiment, the number of periods of the undulating course is between inclusively 8 and inclusively 12.

In an example embodiment of the piston ring, the groove is composed of two different types of portions. A first type of portion runs in circumferential direction. A second type of portion runs in relation to the first type of portion at an acute angle. The two types of portion are respectively connected with one another alternately at their ends.

In an additional embodiment of the piston ring, the groove terminates in reservoirs which are arranged at the thrust ends of the piston ring.

In a further embodiment of the piston ring, the groove 2 runs out in a tapered manner to the thrust ends. By a groove, one cross-section of which reduces slowly in the region of the thrust ends, the wear occurring particularly here can be reduced at the thrust ends.

BRIEF DESCRIPTION OF THE DRAWINGS

The invention is explained in further detail below with the aid of diagrammatic figures of example embodiments, illustrated in the drawings.

DETAILED DESCRIPTION

Both in the figures and also in the description, the same reference numbers are used for identical or similar elements and components.

Figure 1:
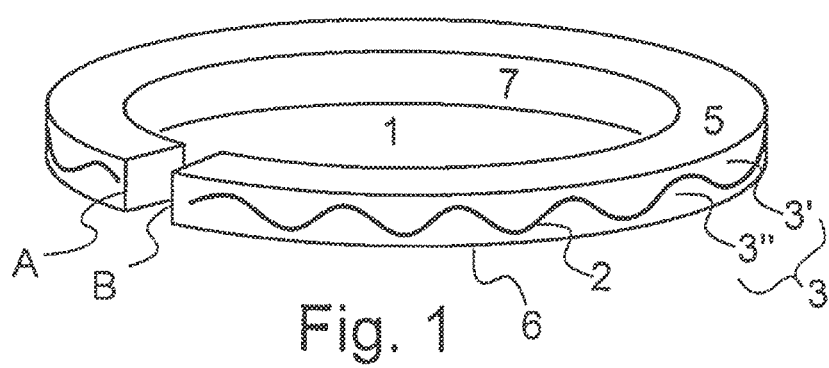
FIG. 1 shows a perspective view onto the piston ring according to the invention, with an undulating groove.

FIG. 1 shows a perspective view onto the piston ring 1 according to the invention, with an undulating groove 2. The groove 2, illustrated here in an undulating manner, runs on the outer side of the piston ring 1, which forms a running surface 3 of the piston ring 1 or respectively an external circumferential surface. The running surface 3 of the piston ring 1 comprises an upper running surface portion 3', which lies closer to the combustion chamber of an engine. The running surface 3 of the piston ring 1 comprises a lower running surface portion 3", which lies closer to an oil chamber or respectively crankcase of the engine. Above, an upper flank 5 of the piston ring, facing the combustion chamber, can be seen. The lower flank 6, facing the crankcase, is concealed by the piston ring 1. Reference number 7 designates an internal circumferential surface 7. The piston ring terminates at the thrust on the two thrust surfaces A and B. The groove 2 is presented, so that it terminates before the thrust surfaces A or respectively B. Thereby, oil which has collected in the groove 2 can not emerge at the thrust surfaces A or respectively B.

Figure 2:
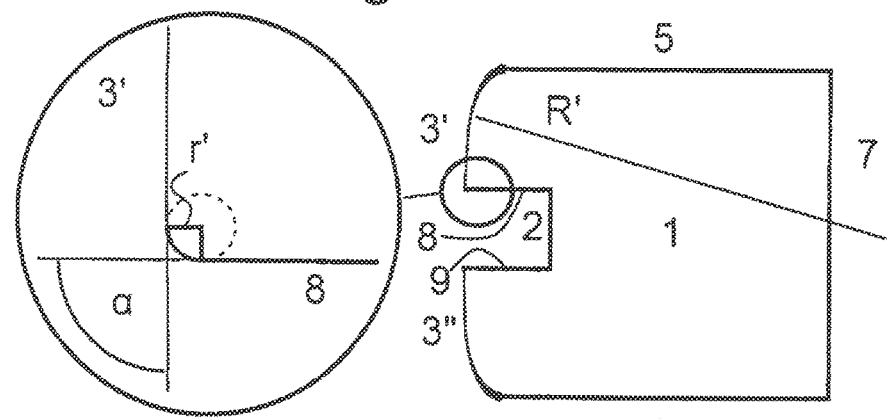
FIG. 2 shows a sectional view in axial direction through an embodiment of the piston ring with rectangular groove.

FIG. 2 shows a sectional view in axial direction through an embodiment of the piston ring 1 with a rectangular groove 2. Instead of the illustrated rectangular groove 2, a groove 2 which is trapezoidal in cross-section can also be used. The groove 2 is illustrated here in the centre, with an undulating groove 2 the vertical position of the groove varies in cross-section. The groove has here an upper groove flank B and a lower groove flank 9. The upper flank 5 facing the combustion chamber, the lower flank 6 facing the crankcase, and the internal circumferential surface 7 are also marked in the cross-section. The entire running surface 3 has a certain convexity, with which a radius of curvature R' is associated. The upper and the lower running surface portion 3', 3" therefore have a shared convexity with the radius of curvature R'. In the detail enlargement, the transition between the upper running surface 3' to the upper groove flank 8 is illustrated. The edge is rounded with an upper edge radius r'. The upper edge radius r' can have been brought about by a processing or produced by a separate machining or forming process. An upper angle α is illustrated between the running surface 3' to the upper groove flank 8. For clarity, a detail view of the lower edge was dispensed with. This is illustrated in FIG. 3.

Figure 3:
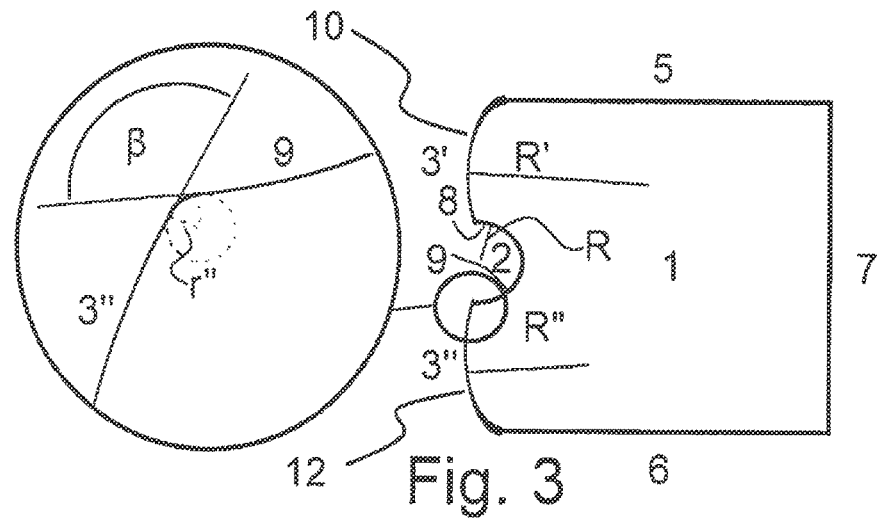
FIG. 3 shows a sectional view in axial direction through an embodiment of the piston ring with a round groove.

FIG. 3 shows a sectional view in axial direction through an embodiment of the piston ring 1 with a round groove 2. Instead of the illustrated circular groove 2, a groove 2 which is elliptical, parabolic or oval in cross-section can also be used. The circular groove 2 has a groove radius of R. The groove 2 is likewise illustrated here in the centre, with an undulating groove 2 the vertical position of the groove varies in cross-section. The groove has here an upper groove flank 8 and a lower groove flank 9, which are respectively defined by the tangents of the round groove at the edges to the running surface portions 3', 3". Here, also, the upper flank 5 facing the combustion chamber, the lower flank 6 facing the crankcase and the internal circumferential surface 7 of the piston ring 1 are marked. The upper running surface portion 3' has a convexity to which an upper radius of curvature R' is associated, which is greater than the corresponding radius of FIG. 2. The lower running surface portion 3" has a convexity to which a lower radius of curvature R". In FIG. 3 both radii of curvature are smaller than that of FIG. 2. In this embodiment, the upper radius R' is greater here than the lower radius R". In the detail enlargement, the transition between the lower running surface 3" to the lower groove flank 9 is illustrated. The edge is rounded with a lower edge radius r". Like the upper edge radius r', the lower edge radius r" can also have been brought about by a processing or produced by a separate machining or forming process. It is possible also to use different radii of curvature r', r" in one piston ring, preferably r">r' is selected, in order to achieve a better scraping of oil on a downward stroke of the piston. A lower angle β is illustrated between the lower running surface 3" and the lower groove flank 9. Compared to the angle α, the angle β is greater, in order to achieve a better scraping of oil on a downward stroke/working stroke of the piston. For better clarity of FIG. 3, a detail view of the upper edge was dispensed with. It is pointed out that the angles α and β can also be used together in one single piston ring, wherein α<β is preferred.

FIGS. 4A to 7 show views of running surfaces of different embodiments of a piston ring with a groove.

Figure 4A:
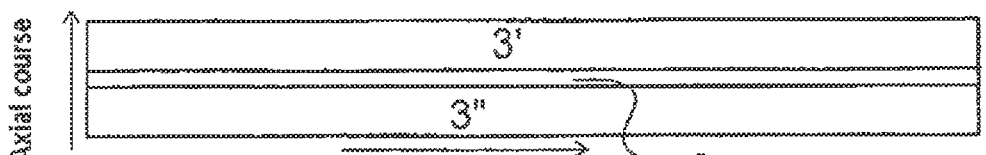
FIGS. 4A to 7 show a view of the running surface of different embodiments of a piston ring with a groove.

FIG. 4A shows a development of a running surface of a simple embodiment with a continuous straight groove 2, which extends from the one thrust end on the right side, which corresponds to the thrust end A of FIG. 1, up to the other thrust end on the left side, which corresponds to the thrust end B of FIG. 1. Here, the groove is open to the thrust or respectively to the thrust ends, so that oil which has collected in the groove can emerge at the thrust or respectively at the thrust ends. The groove 2 divides the running surface into an upper running surface portion 3' and into a lower running surface portion 3".

Figure 4B:
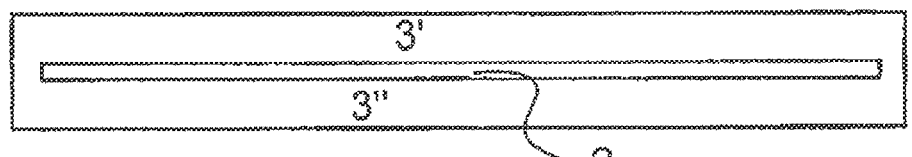

FIG. 4B shows a development of a running surface of a simple embodiment corresponding to FIG. 4A, wherein the straight groove 2 terminates before the thrust end on the right side or respectively the thrust end on the left side. Here, the groove is closed to the thrust or respectively to the thrust ends, so that oil which has collected in the groove can not emerge at the thrust or respectively at the thrust ends. In FIG. 4B the upper running surface portion 3' is connected respectively in the region of the thrust ends with the lower running surface portion 3".

Figure 5A:
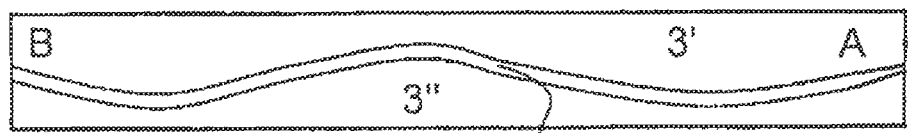
Figure 5B:
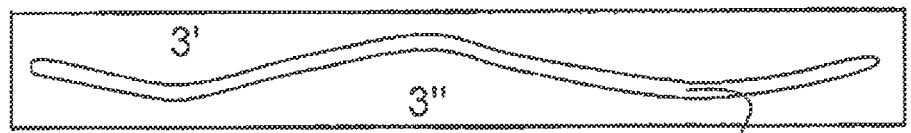

FIG. 5A shows a developed running surface of a simple embodiment corresponding to FIG. 4A, wherein the groove 2 which runs between the running surface portions 3', 3" is embodied as an undulating groove. As in FIG. 4A, the groove runs along the entire length of the piston ring or respectively of the running surface and terminates at the thrust ends. Here also, as in FIG. 4A, oil which has collected in the groove can emerge at the thrust or respectively at the thrust ends. In FIG. 5A the groove at the thrust end B runs out in a straight line. In FIG. 5B the groove 2 at the thrust end A runs out in a tapered manner. Provision is also made that the groove 2 runs out in a straight line at both thrust ends A, B. Provision is also made that the groove 2 runs out in a tapered manner at both thrust ends A, B.

FIG. 5B shows a developed running surface of a simple embodiment corresponding to FIG. 5A, wherein the undulating groove 2 terminates before the thrust end on the right side or respectively the thrust end on the left side. Here, the groove is closed to the trust or respectively to the thrust ends, so that oil which has collected in the groove can not emerge at the thrust or respectively at the thrust ends. In FIG. 5B, the upper running surface portion 3' is respectively connected in the region of the thrust ends with the lower running surface portion 3".

Figure 6A:
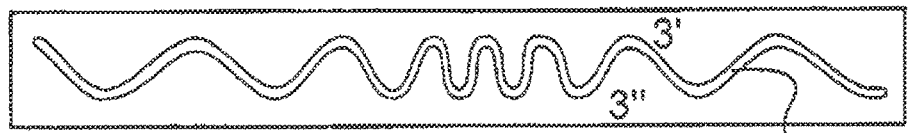
Figure 6B:
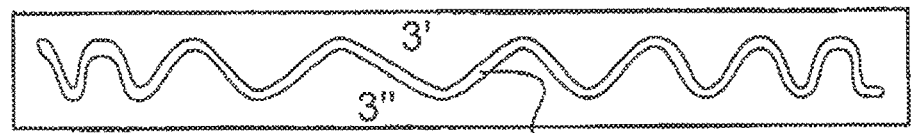
Figure 6C:
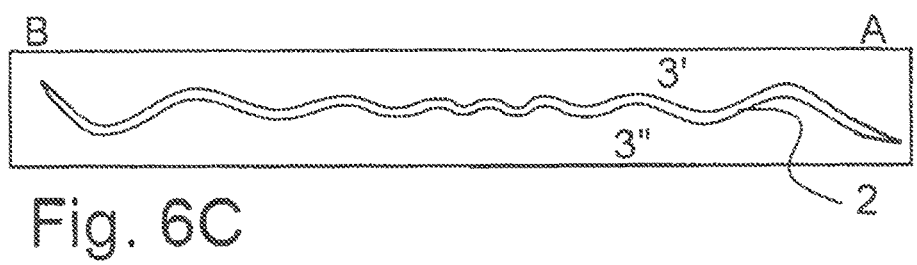

In FIGS. 6A to 6C, different courses of grooves 2, running in an undulating manner, are illustrated. FIGS. 6A to 6C show developed running surfaces. In the development, the ring back is arranged in the centre between the thrust ends and not opposite the thrust ends. In FIGS. 6A to 6C, the upper running surface portions 3' are respectively connected in the region of the thrust ends with the lower running surface portions 3". In FIG. 5B the groove was illustrated at least substantially mirror-symmetrically with respect to the ring back. In FIGS. 6A to 6C, the grooves are illustrated substantially point-symmetrically. In FIGS. 6A and 6B the wave length of the groove 2 changes in course between the thrust ends and the ring back.

In FIG. 6A the groove has a shorter wave length at the ring back than at the thrust ends. Here, the ring can receive greater quantities of oil in the groove 2 at the ring back, whereby it can be prevented that greater quantities of oil are present at the thrust.

In FIG. 6B the groove has a longer wave length at the ring back than at the thrust ends. Here, the ring can receive less oil in the groove 2 at the ring back, whereby it can be achieved that the thrust ends which are particularly affected by wear are lubricated better.

FIG. 6C corresponds substantially to FIG. 6A, wherein in addition an amplitude of the course of the groove 2 in the region of ring back is reduced. Here, the ring can receive less oil in the groove 2 at the ring back than at the thrust ends. In FIG. 6C the groove 2 runs out in a tapered manner to the thrust ends A, B. Provision is also made that the groove 2 also runs out in a tapered manner to the thrust ends A, B in other embodiments.

Provision can also be made to increase the amplitude at the ring back, which, however, is not further embodied here, because this would only protract the description unnecessarily.

Figure 7:
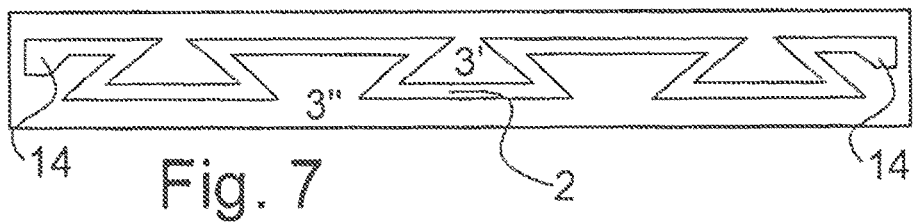

FIG. 7 shows an embodiment of a piston ring according to the invention, in which the groove is composed of two different types of portion. A first type of portion runs in circumferential direction and is illustrated horizontally in the figure. A second type of portion runs at an acute angle in relation to the first type of portion and is illustrated obliquely in the figure. The two types of portion are respectively connected with one another alternately at their ends, and thereby form a type of pattern, in which the groove runs back respectively for a small distance, when it changes from one side to the other side (respectively close to the lower or respectively upper flank). In FIG. 7 the groove 2 terminates in reservoirs 14, which are arranged at the thrust ends of the piston ring and are intended to achieve a particularly good lubrication of the thrust ends.

Some possible embodiments, covered by the claims, were not acknowledged with a separate figure in the drawings, for which reason all combinations of features which are only disclosed individually in figures are to be regarded as disclosed. In addition, it is not illustrated that the groove can have a cross-section in the form of a quadrant. Also, in the drawings, an individual drawing was not made for all the claimed angle values.

The invention claimed is:

1. A piston ring with an external running surface, two flanks and an internal circumferential surface, wherein the running surface has a profiling with a groove, wherein the groove is arranged with respect to the cross-section of the piston ring between an upper running surface portion and a lower running surface portion, wherein the groove runs in an undulating manner between the flanks, wherein the amplitude and/or the wave length of the wave, in which the undulating groove runs, changes in circumferential direction, wherein the piston ring has thrust ends, and wherein the amplitude of the wave increases in the direction of the thrust ends and/or the wave length decreases in the direction of the thrust ends.

2. The piston ring according to claim 1, wherein the undulating groove forms a sinus wave or a cosine wave, which runs around the piston ring, or that the groove runs in an asymmetrical or respectively sawtooth-like wave between the flanks.

3. The piston ring according to claim 1, wherein the groove terminates before a thrust region of the piston ring.

4. The piston ring according to claim 1, wherein the groove has a constant cross-section over its length and preferably a constant cross-sectional shape, with constant depth and constant width.

5. The piston ring according to claim 1, wherein the groove has a round, oval, elliptical, rectangular or trapezoidal cross-section.

6. The piston ring according to claim 5, wherein the round cross-section of the groove preferably has a radius of 0.2 to 2 mm, preferably of 0.4 to 1.6 mm and further preferably of 0.6 to 1.2.

7. The piston ring according to claim 1, wherein the groove has an upper groove flank and a lower groove flank, wherein the upper groove flank forms with the upper running surface portion an upper angle of 45° to 135°, preferably 60° to 120°, further preferably 70° to 110°, and wherein the lower groove flank forms with the lower running surface portion a lower angle of 90° to 170°, preferably 110° to 160° and further preferably 120° to 150°.

8. The piston ring according to claim 7, wherein the upper angle is smaller by 2° to 30°, preferably 4° to 20° and further preferably 6° to 10° than the lower angle.

9. The piston ring according to claim 7 wherein an edge of the upper angle has an upper radius of curvature of 10 to 50 µm, that the edge of the lower angle has a lower radius of curvature of 40 µm to 120 µm, and wherein preferably the upper radius of curvature is smaller by 10 µm to 40 µm than the lower radius of curvature.

10. The piston ring according to claim 1, wherein the external running surface has a radius of curvature between 10 and 60 mm, preferably between 20 and 40 mm and further preferably between 25 and 30 mm.

11. The piston ring according to claim 1, wherein the number of periods of the undulating course is in whole numbers, and/or that the groove in the top view onto the running surface of the piston ring is configured substantially symmetrically and/or that the number of periods of the depth profile and of the width profile lies in a range between inclusively 4 and inclusively 36, preferably between 6 and 24 and further preferably between 8 and 12.

12. The piston ring according to claim 1, wherein the groove is composed of two different types of portion, wherein the first type of portion runs in circumferential direction and the second type of portion is connected with the first type of portion at an acute angle, wherein the two types of portion are respectively connected with one another alternately at their ends.

13. The piston ring according to claim 1, wherein the groove terminates in reservoirs.

14. The piston ring according to claim 1, wherein the groove runs out in a tapered manner to the thrust ends.

15. A piston ring with an external running surface, two flanks and an internal circumferential surface, wherein the running surface has a profiling with a groove, wherein the groove is arranged with respect to the cross-section of the piston ring between an upper running surface portion and a lower running surface portion, wherein the groove runs in an undulating manner between the flanks, wherein the amplitude and/or the wave length of the wave, in which the undulating groove runs, changes in circumferential direction, wherein the piston ring has thrust ends, and wherein the amplitude of the wave decreases in the direction of the thrust ends and/or the wave length of the wave increases in the direction of the thrust ends.

16. The piston ring according to claim 15, wherein the undulating groove forms a sinus wave or a cosine wave, which runs around the piston ring, or that the groove runs in an asymmetrical or respectively sawtooth-like wave between the flanks.

17. The piston ring according to claim 15, wherein the groove terminates before a thrust region of the piston ring.

18. The piston ring according to claim 15, wherein the groove has a constant cross-section over its length and preferably a constant cross-sectional shape, with constant depth and constant width.

\* \* \* \* \*